United States Patent
Katz et al.

(10) Patent No.: US 6,771,989 B1
(45) Date of Patent: Aug. 3, 2004

(54) METHOD OF DIRECTIONAL RADIO COMMUNICATION

(75) Inventors: Marcos Katz, Oulu (FI); Juha T Ylitalo, Oulu (FI)

(73) Assignee: Nokia Networks Oy, Espoo (FI)

( * ) Notice: Subject to any disclaimer, the term of this patent is extended or adjusted under 35 U.S.C. 154(b) by 0 days.

(21) Appl. No.: 10/018,159

(22) PCT Filed: May 1, 1999

(86) PCT No.: PCT/EP99/03093
§ 371 (c)(1),
(2), (4) Date: Apr. 15, 2002

(87) PCT Pub. No.: WO00/67508
PCT Pub. Date: Nov. 9, 2000

(51) Int. Cl.[7] .................................... H04M 1/00
(52) U.S. Cl. ............... 455/562.1; 455/561; 455/63.1; 455/63.4
(58) Field of Search ................ 455/562.1, 561, 455/63.1, 62, 67.11, 67.13, 73, 269, 277.1, 277.2, 25, 517; 342/359, 368, 367, 422

(56) References Cited

U.S. PATENT DOCUMENTS

| | | | |
|---|---|---|---|
| 5,966,670 A | * 10/1999 | Keskitalo et al. | 455/562.1 |
| 6,229,481 B1 | * 5/2001 | Katz | 342/367 |
| 6,240,098 B1 | * 5/2001 | Thibault et al. | 370/431 |
| 6,289,005 B1 | * 9/2001 | Katz | 370/328 |
| 6,321,066 B1 | * 11/2001 | Katz et al. | 455/25 |
| 6,321,082 B1 | * 11/2001 | Katz | 455/422.1 |
| 6,392,595 B1 | * 5/2002 | Katz et al. | 342/367 |
| 6,393,303 B1 | * 5/2002 | Katz | 455/562.1 |
| 6,553,012 B1 | * 4/2003 | Katz | 370/328 |

FOREIGN PATENT DOCUMENTS

| | | |
|---|---|---|
| EP | 0777400 A2 | 6/1997 |
| WO | WO96/37969 | 11/1996 |
| WO | WO98/13952 | 4/1998 |
| WO | WO99/60809 | 11/1999 |

* cited by examiner

Primary Examiner—Sonny Trinh
(74) Attorney, Agent, or Firm—Ohlandt, Greeley, Ruggiero & Perle, L.L.P.

(57) ABSTRACT

A method of directional radio communication in a wireless communications network between a first station and a second station. The method comprises the steps of transmitting a plurality of communication bursts from the first station to the second station, each of the bursts being substantially continuous and comprising a reference signal having a plurality of reference signal components and a data signal having a plurality of data signal components wherein respective signal components of the reference signal are transmitted in substantially different directions, the data signal components being transmitted in the substantially different directions.

19 Claims, 4 Drawing Sheets

METHOD OF DIRECTIONAL RADIO COMMUNICATION

This invention relates to a method of directional radio communication and in particular, but not exclusively, to a method of signal processing for use in cellular communication networks using space division multiple access.

Cellular communication networks based on space division multiple access and the advantages associated therewith are well known. The area covered by a cellular network is divided into a plurality of cell or cell sectors. Each cell is served by a base station which transmits signals to and receives signals from mobile stations located in the cell or cell sector associated with the respective base station. In a space division multiple access system, the base transceiver station will not transmit signals intended for a given mobile station throughout the cell or cell sector but will only transmit the signal in a beam direction from which a signal from the mobile station is received.

As the beam which is transmitted by the base transceiver station may only be transmitted in a particular direction and accordingly may be relatively narrow, the transmission power is concentrated into that narrow beam. This results in a better signal to noise ratio with both the signals transmitted from the base transceiver station and the signals received by the base transceiver station. Additionally, as a result of the directionality of the base transceiver station, an improvement in the signal to interference ratio of the signal received by the base transceiver station can be achieved. The interference caused by the signal transmitted by the base station to the mobile station to other mobile stations in the same cell or adjacent cells is also reduced. This increases the capacity of the system and/or increases the quality of communication.

SDMA systems can be implemented in analogue and digital cellular networks and may be incorporated in the various existing standards such as GSM, DCS 1800, TACS, AMPS and NMT. SDMA systems can also be used in conjunction with other existing multiple access techniques based, for example, on time division multiple access (TDMA), code division multiple access (CDMA), such as that described by the US IS-95 CDMA standard and the proposed third generation standard, and frequency division multiple access (FDMA) techniques.

As is known, a signal from a mobile station will generally follow several paths to the BTS. Those plurality of paths are generally referred to as multipaths. A given signal which is transmitted by the mobile station may then be received by the base transceiver station from more than one direction due to these multipath effects.

Signals transmitted from a mobile station to a base transceiver station are known as "uplink" signals and signals transmitted from a base transceiver station to a mobile station are known as "downlink" signals. The uplink communication stream received by the base transceiver station from the mobile station comprises a series of communication bursts received in successive time slots. Each received burst of the uplink communication stream includes a reference signal and a data signal and these portions in turn each comprise a succession of signal components referred to hereinafter as bits. Likewise, the downlink communication stream transmitted from the base transceiver station to the mobile station comprises a series of communication bursts transmitted in successive time slots. Each respective burst of the downlink communication stream includes a reference signal and a data signal, each of which in turn comprising a succession of signal components referred to hereinafter as bits. The reference signals of the uplink and downlink communication streams are, in this example, referred to as pilot signals to be consistent with CDMA terminology.

It has been proposed that Pilot signals transmitted from the mobile station MS be used by the receiving base station to monitor the spatial properties of the receive communication stream in order to determine optimum transmission parameters. Conventional adaptive base transceiver stations process each communication burst received in the uplink direction to determine parameters for the corresponding burst in the downlink direction. The direction of transmission to be used in the downlink communication for a given time slot is determined based on direction of arrival information estimated from the uplink communication of the corresponding time slot, the uplink and downlink signals being at different frequencies.

Circuitry within the base transceiver station determines, for each receive time slot, an angular power profile of the uplink signal impinging on the base station antenna array from the mobile station and indicates transmission parameters to be used in each transmission time slot. In practice, the determined angular power profile is supplied to signal processing and decision circuitry which executes a beam selection algorithm to determine the downlink transmission parameters. Thus, the direction of transmission for a given communication burst, including for the pilot and data signals within that burst, is determined from estimations of parameters of pilot symbols received from the mobile station during the corresponding uplink communication burst and are kept fixed for at least the duration of that burst, i.e. for the entire transmission time slot.

However, since the envelope of the signal received at the base transceiver station will depend on the combination sum of a large number of signals having phases related with their respective carrier frequencies, it can be said that the short term responses (e.g. instantaneous behaviour) of the uplink and downlink channels will be uncorrelated. That is, the uplink and downlink channels are reciprocal only in the long term. One result is that the channel and directions of signal arrival (DoA) estimated from the uplink do not correspond with those required to communicate properly with the mobile station in the downlink direction. This problem worsens in environments characterized by larger angular spreads (e.g., micro-and pico-cells) and also when the angular resolution of base station is increased (e.g., the number of antenna elements is large).

The performance of downlink is measured not only in terms of the quality of signal registered at the receiving mobile station but also taking into consideration the operative cost required to achieve that level of quality. The base station aims to achieve at the mobile station a signal quality which is sufficient to produce an acceptable and/or predetermined quality of service with minimum expenditure of resources. Spectral efficiency has direct impact on system capacity and link performance. Improving link performance will generally require an increase in transmission power or increased use of diversity, which tend to increase the level of generated interference. The nature of interference is different from widely angular (e.g., omnidirectional/sector antennas) to narrowly angular (e.g., adaptive antennas). In the case of widely angular antennas, since the energy is evenly distributed over the whole cell/sector, the interference is characterized by a low angular density. Whereas in the case of angularly narrow antennas, the interfering energy is concentrated in the narrow beams used. In multi-rate systems proposed in wide band-CDMA standards where high-bit rate users transmit with correspondingly high power levels, the conventional use of adaptive antennas described hereinbefore will produce highly coloured spatial interference.

Embodiments of the present invention seek to provide an improved method for directional radio communication.

According to an aspect of the present invention there is provided a method of directional radio communication in a wireless communications network between a first station and a second station, said method comprising the steps of transmitting a plurality of communication bursts from said first station to said second station, each of said bursts being substantially continuous and comprising a reference signal having a plurality of reference signal components and a data signal having a plurality of data signal components wherein respective signal components of said reference and/or data signals are transmitted in substantially different directions.

Preferred methods improve link quality because they lead to improvements in spatial correlations between the uplink and downlink channels. Preferred methods also provide fast angular diversity and the efficient whitening of the generated co-channel interference. Methods embodying the invention have particular advantages in radio environments characterised by large angular spreads and/or where base transceiver stations have relatively high angular resolutions.

A number of pilot and/or data signal transmission schemes may be employed in various embodiments. In one embodiment, a number of pilot reference signal components are transmitted in different directions at different times, consecutive reference signal components being transmitted in different directions and a number of said data signal components are transmitted in different directions at different times, the order of directional transmission used corresponding to that used during transmission of said reference signal components.

In another embodiment, a number of pilot signal components are transmitted in different directions at substantially the same time and a number of said data signal components are transmitted in different directions at different times. This allows the data signal components to be transmitted without regard to the order of directional transmission used.

In another embodiment, a different spreading code is used for transmission in each direction.

In another embodiment, the transmission of pilot signals is distributed throughout the communication burst with sets of data signal components disposed therebetween.

According to another aspect of the present invention there is provided a transceiver station for directional radio communication in a wireless communications network between a first station and a second station, said transceiver station comprising means for transmitting a plurality of communication bursts from said first station to said second station, each of said bursts being substantially continuous and comprising a reference signal having a plurality of reference signal components and a data signal having a plurality of data signal components, said means being operable to transmit respective signal components of said reference signals in substantially different directions, the data signal components being transmitted in said substantially different locations.

For a better understanding of the present invention and as to how the same may be carried into effect, reference will be made by way of example only, to the accompanying drawings in which:g drawings in which.

Figure 1:
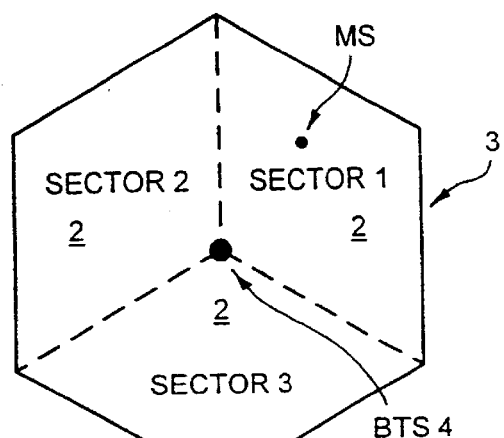
FIG. 1 is a schematic view of a base transceiver station and its associated cell sectors.

Reference will first be made to FIG. 1 which shows three cell sectors 2 of a cellular mobile telephone network. The three cell sectors 2 are served by respective base transceiver stations (BTS) 4. Three separate base transceiver stations 4 are provided at the same location. Each BTS 4 has a transceiver which transmits and receives signals to and from a respective one of the three cell sectors 2. Thus, one dedicated base transceiver station is provided for each cell sector 2. Each BTS 4 is thus able to communicate with mobile stations (MS) such as mobile telephones which are located in respective cell sectors 2.

Data is transmitted between the BTS 4 and the MS in communication bursts. The communication bursts include a reference signal which is a known sequence of data. The purpose of the reference signal is generally to allow information which assists operation of the system to be obtained. This type of information includes, for example, direction of arrival information, signal strength information and delay information. In current GSM systems the reference signal is referred to as the training sequence, whereas in CDMA systems the reference signal corresponds to the pilot signal.

Preferred embodiments will be described in the context of a code division multiple access system which uses an antenna array at the base station. Each communication burst is transmitted in a given communication channel defined by the selected direction and the applied spreading code.

Figure 2:
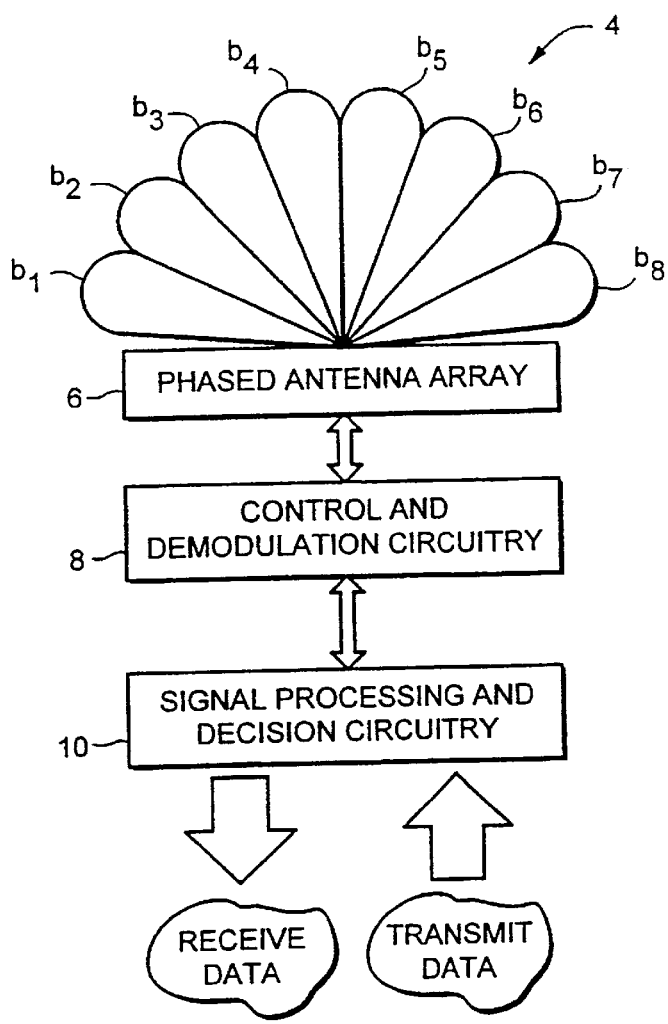
FIG. 2 is a schematic view of the base transceiver station of FIG. 1.

FIG. 2 shows a schematic view of a base transceiver station 4 suitable for code/space division multiple access systems. It should be appreciated that the various blocks illustrated in FIG. 2 do not necessarily correspond to separate elements of an actual base transceiver station for performing the method of the present invention. The various blocks illustrated in FIG. 2 correspond to various functions carried out by the base transceiver station. The base transceiver station 4 has an antenna array 6. The base station 4 only serves one of the three cell sectors 2 shown in FIG. 1. Another two base stations 4 are provided to serve the other two cell sectors 2. In this example, the antenna array 6 has eight antenna elements. The elements are arranged to have a spacing of about a half wavelength between each antenna element and are arranged in a horizontal row in a straight line. Each antenna element is arranged to transmit and receive signals and can have any suitable construction. Each antenna element may be a dipole antenna, a patch antenna or any other suitable antenna. The eight antenna elements together define a phased antenna array 6.

As is known, each antenna element of the phased array antenna 6 is supplied with the same signal to be transmitted to a mobile station MS. However, the phases of the signals supplied to the respective antenna elements are shifted with respect to each other. The differences in the phase relationship between the signals supplied to the respective antenna elements gives rise to a directional radiation pattern. The antenna array 6 can be controlled to provide a beam $b_1$–$b_8$ in one or more of the eight directions illustrated. For example, the antenna array 6 could be controlled to transmit a signal to a MS only in the direction of beam $b_5$ or only in the direction of beam $b_6$ or in more than one beam direction at the same time. For example, a signal may be transmitted in the two directions defined by beam $b_5$ and beam $b_6$.

FIG. 2 is only a schematic representation of the eight possible beam directions which can be achieved with the antenna array 6. In practice, however, there will in fact be an overlap between adjacent beams. In some embodiments of the present invention, the width of the beams can be varied as well as the number of beams which are provided to cover a given area.

The control and demodulation circuitry 8 includes beam forming circuitry such as Butler matrix circuitry, amplifier stages, analogue-to-digital converter arrays and digital to analogue converter arrays. In the receive direction, the beam forming circuitry detects the phase difference between each of the signals received by the respective antenna elements and uses this information to determine the or each beam direction from which the signal has been received. Received signals are typically then passed through the amplifier stages to demodulation circuitry where the carrier frequency component is removed. The received analogue signal is converted to a digital signal and is output to the signal processing and decision circuitry 10. In the transmit direction, the relative phase of the signal supplied to each antenna element and thus also the desired beam direction is controlled by the beam forming circuitry. Before being supplied to the antenna elements digital data from the signal processing circuitry are converted to analogue signals and modulated onto the carrier frequency.

The signal processing and decision circuitry 10 removes the spreading codes from the received signal. The signal processing and decision circuitry determines the channel impulse response for the received signals from which parameters used to define a channel for transmission of subsequent signals can be determined. The signal processing and decision circuitry 10 also carries out cross-correlation and analysis. Cross-correlation is used to generate taps which are representative of the channel impulse response for that correlation and compares received signals and stored information. A channel impulse response is generated for each channel corresponding to a given communication burst received in each of the eight antenna directions $b_1$–$b_8$. A given communication burst may be received in one or more beam directions.

The analysis carried out within the signal processing and decision circuitry 10 is for determining and storing the maximum energy calculated from the channel impulse response. The signal processing and decision circuitry 10 also analyses the channel impulse responses to ascertain the minimum delay with which a given signal is received The channel with the minimum delay may represent the line of sight path between a mobile station and its base transceiver station.

Decision circuitry of the signal processing and decision circuitry 10 compares the determined parameters for each channel to select transmission parameters for signals to be subsequently transmitted. The decision circuitry selects transmission parameters such as beam direction and power level based on information from the received signals. This selection can use simple methods for selection such as selecting the beam direction(s) having the maximum energy and minimum delay in the received signals. Alternatively, more complicated methods of selection may be used.

Figure 3:
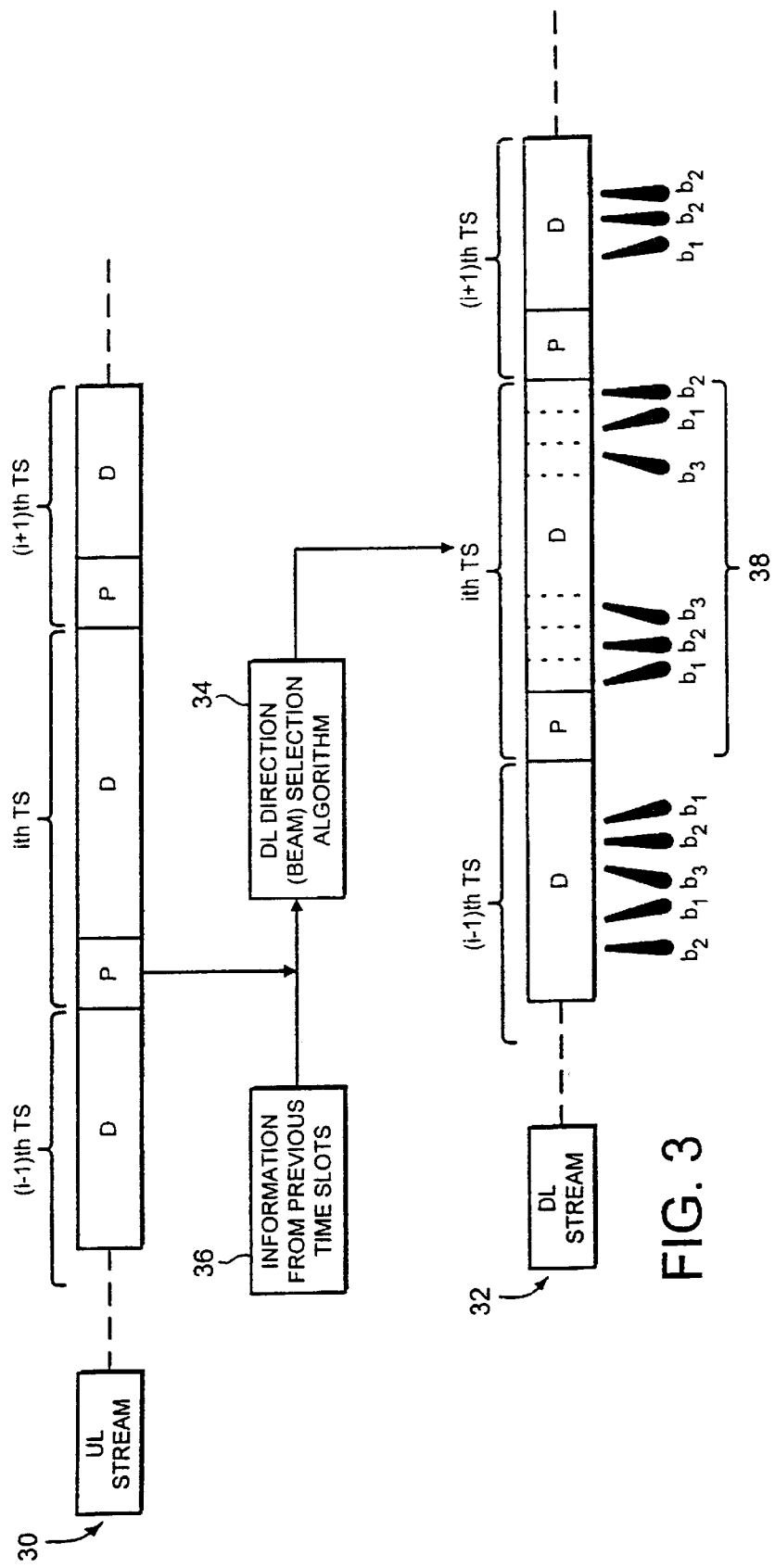
FIG. 3 is a schematic illustration of a first embodiment of the method of directional radio communication.

FIG. 3 schematically illustrates a bit level processing method for use in directional radio communication networks. As shown in FIG. 3, the base transceiver station receives an uplink communication stream 30 from a mobile station MS. The uplink communication stream 30 comprises a series of communication bursts in (i+1) th, ith and (i+1)th receive time slots, respectively. Each communication burst includes a pilot signal P and a data signal D, each of which in turn comprising a plurality of signal bits. The signal processing and decision circuitry 10 of the base transceiver station 4 uses a beam selection algorithm 34 to determine transmission directions for a given downlink communication time slot based on the pilot signal received in the corresponding uplink communication burst and possibly also taking into account information from previous time slots 36.

For communication in the downlink direction the direction selected for transmission is varied within the communication burst (i.e. within a given time slot). For example, respective bits of the pilot signal P and/or data signal D of the downlink communication burst are transmitted in different directions. This is schematically illustrated for the data signal by the directional antenna lobes $b_1$, $b_2$ and $b_3$ of FIG. 3. Preferably, the direction of transmission is changed from bit to bit so that the directions employed will thus repeat themselves in a cyclical manner. The total number of selectable beam directions may be a predetermined number. In FIG. 3, three directions are used in some of the time slots. The number of directions used may vary from time slot to time slot.

Figure 4:
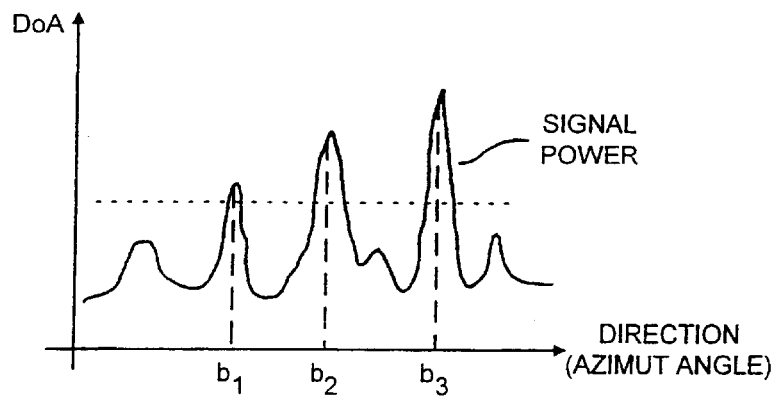
FIG. 4 is an example of direction of arrival data.

According to the general scheme of FIG. 3 the base transceiver station 4 estimates an angular power profile upon reception of an uplink communication burst and using this information determines the directions of transmission to be used in the corresponding downlink communication burst. This angular power profile is based on the pilot signals and includes direction of arrival information, an example of which is provided in FIG. 4. The power profile illustrated in FIG. 4 shows estimated signal power (above a given threshold Th) as a function of antenna beam direction measured in azimuthal angle of arrival. According to the angular power profile of FIG. 4, signals of appreciable strength i.e. above the threshold Th are received simultaneously in the antenna beam directions $b_1$, $b_2$ and $b_3$, with the signal of maximum energy being received from direction $b_3$. The predetermined threshold Th is used to ensure that only directions of arrival having appreciable signal strengths are taken into account.

The base transceiver station 4 transmits a pilot signal P indicating the directions of transmission to be used in the subsequent transmission of the data signal D of that communication burst. This allows the mobile station MS to estimate the channel corresponding to each of the directions of transmission to be used. In some embodiments, a plurality of pilot signal components are transmitted simultaneously and in others a pre-determined pilot transmission sequence is employed. The pilot transmission can be carried out by a number of different schemes. Data transmission in the downlink direction involves, where ever possible, consecutive bits of the data signal being transmitted in different directions. Where a predetermined pilot transmission sequence is employed, benefits from this type of directional hopping are maximised if the directional transmission pattern employed in the transmission of data corresponds to that defined by the pilot signal components of the same burst, as will be explained in more detail hereinafter.

The mobile station will have prior knowledge that the base transceiver station 4 will use varying directions of transmission in the course of a downlink communication burst. In the method embodying the present invention bit level downlink processing of the signal to be transmitted takes place. When the spatial and temporal granularity of the transmitted signal is broken down to the bit level as described herein, gain is obtained not only in terms of diversity in the desired signal (bit level beam-hopping), but also from the interference standpoint. The main advantages of this method are the improvement of the link quality in the downlink direction and the increase of the system capacity. Preferred embodiments provide fast angular diversity and efficiently whiten (randomize) the generated co-channel interference. The former is advantageous in low mobility environments while the latter alleviates the effects of interference to other users by whitening the structure of the transmitted signal in the spatial and temporal domains.

Figure 5:
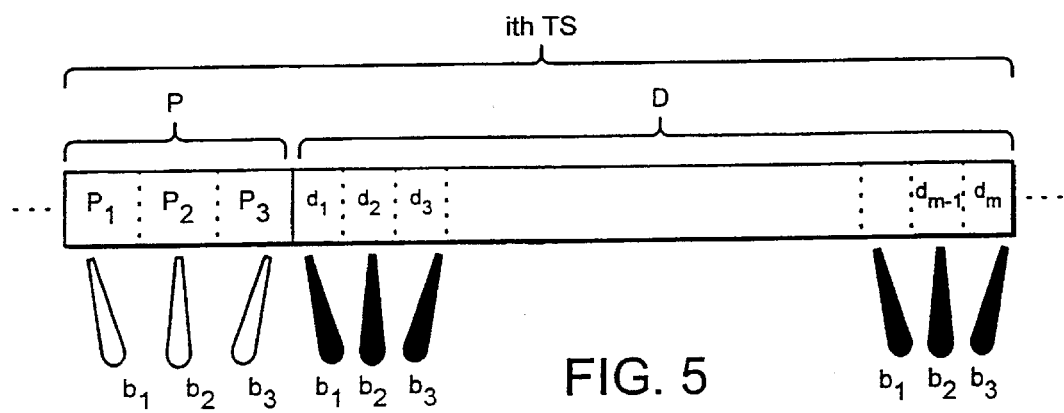
FIG. 5 is a more detailed representation of a downlink communication burst used in a second embodiment.

According to a second embodiment illustrated in FIG. 5, an angular beam profile such as that in FIG. 4 is established by the processing and decision circuitry 10 of the base transceiver station 4 and the beam directions $b_1$, $b_2$ and $b_3$ corresponding to the received directions $b_1$, $b_2$ and $b_3$ are determined as the downlink directions of transmission for the ith time-slot. Preferably, at least a component of pilot signal P is to be transmitted in each of these directions. In this example, pilot signal components are transmitted three times in the time slot. The pilot signal bits or bit sequence $P_1$, $P_2$ and $P_3$ may be the same or different. Preferably they are different. The pilot signal of the down link communication burst comprises a first pilot signal bit $P_1$ transmitted towards the first direction $b_1$, a second pilot signal bit $P_2$ transmitted towards the second direction $b_2$ and a third pilot signal bit $P_3$ transmitted in the third direction $b_3$. The three pilot signal bits $P_1$, $P_2$ and $P_3$ are thus transmitted consecutively. The receiving mobile station uses the pilot signal bits of the communication burst to estimate the channel impulse response associated with each transmitted direction. The data bits $d_1$, $d_2$ and $d_3$ of the ith time slot are then respectively transmitted in the corresponding directions $b_1$, $b_2$ and $b_3$. The predetermined transmission order of the pilot signal bits $P_1$, $P_2$ and $P_3$ defines a directional hopping pattern which is replicated during transmission of the data bits $d_1$, $d_2$ and $d_3$ of the same communication burst. Successive data bits are transmitted in different directions.

This enables the mobile station MS to process each received data bit using information obtained from the pilot signal received from the same respective direction.

For simplicity and to minimise the use of overhead information, the number of transmitted pilot signals Np can be kept fixed from one communication burst to the next. For example, Np may equal 3. If the number of available directions of transmission exceeds the number of pilot signal bits Np only the best Np directions are selected for downlink transmission. Alternatively, if the number of available directions for transmission is lower than the number of pilot signal bits Np, some directions can be repeated in the transmission. In this case, the downlink transmission direction is varied such that the same direction is not used for the transmission of consecutive data bits.

In this embodiment, the directions of transmission for the downlink direction are selected based on the energy of the corresponding received signal in the uplink direction. However, as mentioned in relation to the signal processing and control circuitry 10, any suitable criteria can be used to determine the beam directions for transmission. For example, other embodiments take into account minimisation of the generated interference in certain directions.

FIG. 5 thus illustrates a second embodiment in which pilot signal bits of a communication burst are transmitted in serial fashion, each pilot signal bit being transmitted at a particular time and in a different direction to the preceding pilot signal. The data signal bits for that communication burst are subsequently transmitted in corresponding directions and in the same order as the pilot signals. This embodiment is referred to herein as the time orthogonal pilot transmission (TOPT) method. The beams themselves may not be orthogonal. The width of the beams may be alterable.

Figure 6:
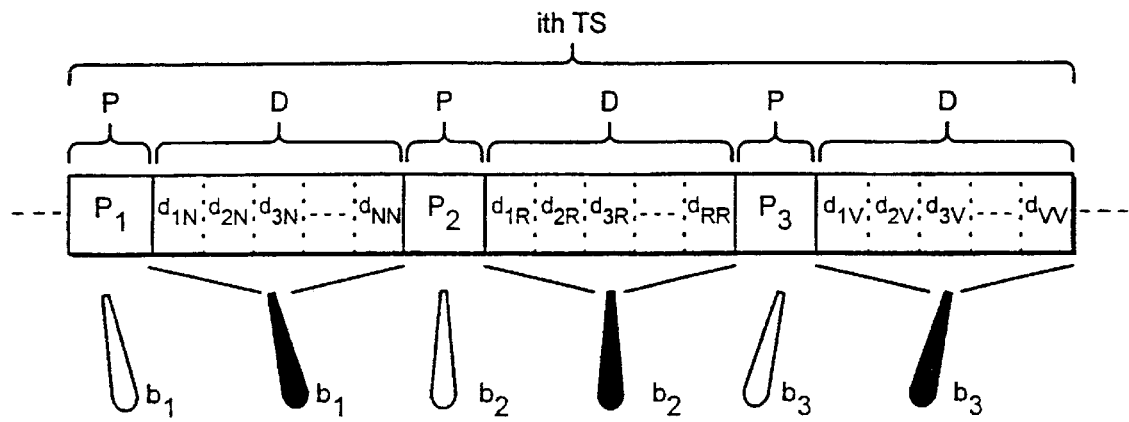
FIG. 6 is a representation of a downlink communication burst used in a third embodiment of the method of directional radio communication.

FIG. 6 illustrates a third embodiment which is a modified version of the time orthogonal pilot transmission method, in which the pilot signals corresponding to each direction are distributed throughout the communication burst. In the illustrated ith time slot, the pilot signal P is transmitted in three directions to define three pilot signal bits $P_1$, $P_2$ and $P_3$. These three pilot signal bits are distributed evenly throughout the slot and are each followed by a data block comprising consecutive data bits. According to FIG. 6, a first pilot bit $P_1$ is transmitted in the direction $b_1$ as is the subsequent data block comprising data bits $d_{1N}$, $d_{2N}$, $d_{3N}$ to $d_{NN}$. The second pilot bit $P_2$ is transmitted in a second direction $b_2$ and the next data block comprising data bits $d_{1R}$, $d_{2R}$, $d_{3R}$ to $d_{RR}$ is also transmitted in the direction $b_2$. Likewise, the third pilot bit $P_3$ defines the direction of transmission for a third data block comprising data bits $d_{1\nu}$, $d_{2\nu}$, $d_{3\nu}$ to $d_{\nu\nu}$. There is three directional hopping within the time slot of a single communication burst. Note, however, that the embodiment of FIG. 6 employs a slower rate of directional hopping within a time slot than the embodiment of FIG. 5.

Figure 7:
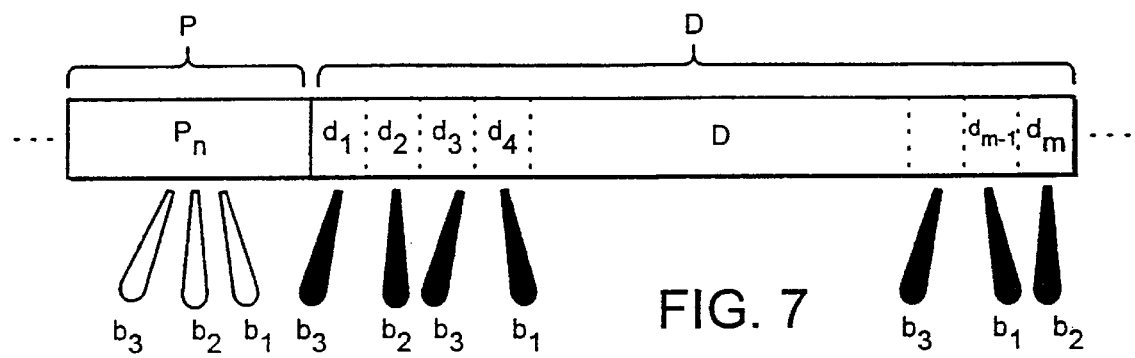
FIG. 7 is a representation of a downlink communication burst used in a fourth embodiment of the method of directional radio communication.

If the directions determined from the uplink communication direction are spatially orthogonal to each other, a fourth embodiment illustrated in FIG. 7 can be used. The determined directions are considered to be orthogonal if their angular separation between the beam maxima is greater than about the one half power beam width. Assuming the radio environment carries a sufficiently large angular spread, then the use of a conventional analogue beam former (e.g. butler matrix circuitry) achieves orthogonal antenna beam directions during both transmission and reception. The embodiment of FIG. 7 is referred to herein as a space orthogonal pilot transmission (SOPT) method. The pilot signal P transmission in the downlink direction involves the simultaneous transmission of pilot signal bits $P_n$ towards all of the determined directions of transmission $b_1$, $b_2$ and $b_3$. Thus, the transmission of pilot signal bits occurs at the same time and beam directions $b_1$, $b_2$ and $b_3$ are orthogonal. The subsequent data signal transmission D is performed by employing different directions for consecutive data bits but in this case the order of transmission need not necessarily follow a predetermined directional transmission pattern, as was suggested with the embodiment of FIG. 6. Here, the selection of directions for transmission of data bits can follow any order, provided all of the directions are defined by the pilot signal and are orthogonal. In this example, the selection of direction for data bit transmission is random with each direction $b_1$, $b_2$ and $b_3$ being used on average an equivalent number of times. This is possible because at the receiving mobile station each received bit is convolved (correlated) with the channel response of the whole channel, including all of the directions involved. Since these directions are orthogonal to the received signal, their effect will in principal be eliminated.

Figure 8:
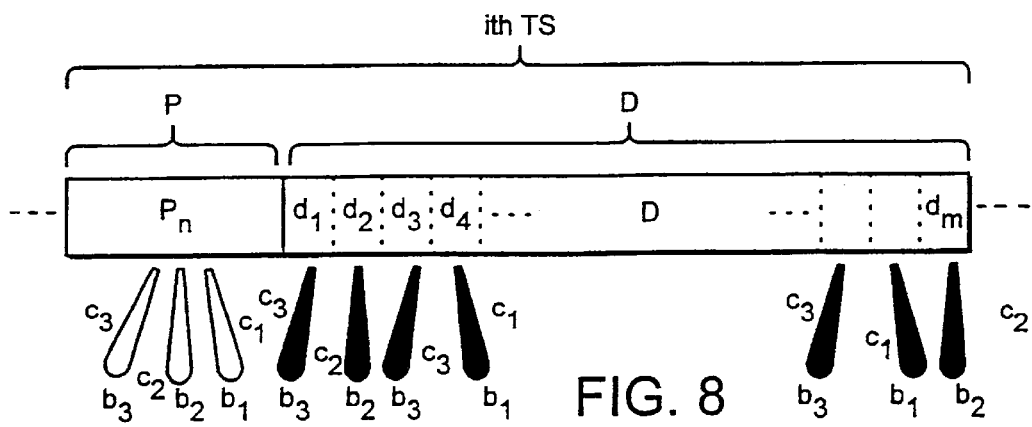
FIG. 8 is a representation of a downlink communication burst used in a fifth embodiment of the method directional radio communication.

In a fifth embodiment illustrated in FIG. 8, a fixed number Np of pilot signals are transmitted simultaneously towards the directions of transmission to be used in the transmission of data bits within the same communication burst. The pilot signal for each direction has a unique code which is orthogonal to other codes being used in the pilot signal transmission. Hence, this embodiment is referred to herein as code orthogonal pilot transmission (COPT). Referring to FIG. 8, the pilot signal bits $P_n$ comprises three pilot signals having the spread codes $C_1$, $C_2$ and $C_3$ which are transmitted simultaneously in the directions $b_1$, $b_2$ and $b_3$. Thereafter, consecutive bits of the data transmission $d_1$, $d_2$, $d_3$, $d_4$ to $d_m$ are transmitted in different directions and using the spreading codes defined for the particular direction concerned during the pilot transmission. The mobile station MS is able to estimate individually the channel impulse responses corresponding to each direction and, as with the embodiment of FIG. 7, consecutive data bits can be transmitted by the base transmitter station to the mobile station MS in different directions using any directional transmission pattern, provided that when transmitting in the Nth direction, the associated Nth code is used. The receiving mobile station MS will convolve the information of a given bit with the channel impulse response of the complete channel comprising all the directions of transmission used and their associated codes but, due to code orthogonality, only information of the relevant transmitted bit is retained.

The performance of the various embodiments described leads to improvements in correlations between the directions of arrival estimated from the uplink communications and the selection of transmission directions for the downlink channels. Significant advantages include the provision of fast angular diversity and the efficient whitening of the generated co-channel interference, particularly in multi-rate systems (e.g. W-CDMA and future wireless networks) in which high bit rate users transmit with relatively high power levels and the conventional use of adaptive antennas produces highly coloured spatial interference. Methods embodying the invention have particular advantages in radio environments characterised by large angular spreads (e.g. micro and pico cells) and when angular resolution of the base transceiver station is relatively high. The performance of the method improves as the angular spread of radio environment and spatial resolution of BTS increase. This is because as angular spread increases and the generated beams become narrower, the BTS can efficiently exploit the benefits of operating in the spatial domain. For example, more hopping directions become available as these conditions are applied.

Embodiments of the invention can advantageously be used in micro and/or pico cells environments. Such radio environments not only carry large angular spreads but are also characterized by small delay spreads due to the small size of those environments. This is greatly beneficial, particularly in schemes exploiting orthogonality (e.g., code orthogonality). It is also in these environments where high bit-rate uses can be expected. The level of co-channel interference generated to serve these users is reduced by employing methods embodying the present invention.

The quality of the channel estimation at the receiving mobile station MS is heavily dependent on the amount of energy used for transmitting the pilot signal bits. Since pilot transmission is multiplexed with respect to time-, space- and/or code domains, when the same energy as that used in the conventional methods (slot-level processing) is distributed among the pilots, the effective energy per pilot is smaller. This degradation in the pilot signal power is compensated by the array gain.

The pilot and/or data signal transmissions within a communication burst may be multiplexed with respect to time, frequency, space or spreading code. Methods illustrated with respect to pilot signal transmission can be applied equally to data signal transmission. The different methods described hereinbefore can be used separately or in any combination.

Whilst embodiments of the present invention have been described in the context of a CDMA system, embodiments of the present invention can be used with any other type of access system. Embodiments of the present invention can be implemented in a mobile station as well as a base station.

What is claimed is:

1. A method of directional radio communication in a wireless communications network between a first station and a second station, said method comprising the steps of:
   transmitting a plurality of communication bursts from said first station to said second station, each of said bursts being substantially continuous and comprising a reference signal having a plurality of reference signal components and a data signal having a plurality of data signal components,
   wherein respective signal components of said reference signal are transmitted in substantially different directions, the data signal components being transmitted in said substantially different directions, and
   wherein one or more of said data signal components is transmitted before the last reference signal component of the communication burst.

2. A method as in claim 1, wherein a number of said plurality of reference signal components are transmitted in different directions at different times, successive reference signal components being transmitted in different directions.

3. A method as in claim 1, wherein said reference signal components are transmitted consecutively.

4. A method as in claim 1, wherein a number of said plurality of reference signal components are transmitted in different directions at substantially the same time.

5. A method as in claim 1, wherein a number of said plurality of data signal components are transmitted in different directions at substantially the same time.

6. A method as in claim 1, wherein a number of said plurality of data signal components are transmitted in substantially different directions, at different times and consecutively.

7. A method as in claim 6, wherein consecutive data signal components are transmitted in said different directions without regard to the order of directional transmission of said reference signal components.

8. A method as in claim 1,
   wherein said reference signal components are transmitted consecutively,
   wherein a number of said plurality of data signal components are transmitted in substantially different directions, at different times and consecutively, and
   wherein the order of directional transmission of said data signal components corresponds to that used during transmission of said reference signal components.

9. A method according to claim 1, wherein said data signal components are divided into a plurality of sets, each set being transmitted after a respective reference signal component.

10. A method according to claim 9, wherein each set of data signal components is transmitted in the same direction as the preceding reference signal component.

11. A method according to claim 1, used in a code division multiple access system.

12. A method according to claim 11, wherein a different spreading code is used for the transmission of respective reference signal bits in each direction.

13. A method according to claim 11, wherein the reference signal is a pilot signal.

14. A method according to claim 12, wherein the spreading codes used in the transmission of said reference signal components in said different directions are also used in the transmission of data signal components in the corresponding directions.

15. A transceiver station for directional radio communication in a wireless communications network between a first station and a second station, said transceiver station comprising:
  means for transmitting a plurality of communication bursts from said first station to said second station, each of said bursts being substantially continuous and comprising a reference signal having a plurality of reference signal components and a data signal having a plurality of data signal components, said means being operable to transmit respective signal components of said reference signals in substantially different directions, the data signal components being transmitted in said substantially different locations,
  wherein one or more of said data signal components is transmitted before the last reference signal component of the communication burst.

16. A method of directional radio communication in a wireless communications network between a first station and a second station, said method comprising the steps of:
  transmitting a plurality of communication bursts from said first station to said second station, each of said bursts being substantially continuous and comprising a reference signal having a plurality of reference signal components and a data signal having a plurality of data signal components, wherein respective signal components of said reference signal are transmitted in substantially different directions, the data signal components being transmitted in said substantially different directions,
  wherein said reference signal components are transmitted consecutively,
  wherein a number of said plurality of data signal components are transmitted in substantially different directions, at different times and consecutively, and
  wherein the order of directional transmission of said data signal components corresponds to that used during transmission of said reference signal components.

17. A method of directional radio communication in a wireless communications network between a first station and a second station, said method comprising the steps of:
  transmitting a plurality of communication bursts from said first station to said second station, each of said bursts being substantially continuous and comprising a reference signal having a plurality of reference signal components and a data signal having a plurality of data signal components,
  wherein respective signal components of said reference signal are transmitted in substantially different directions, the data signal components being transmitted in said substantially different directions,
  wherein a number of said plurality of data signal components are transmitted in substantially different directions, at different times and consecutively, and
  wherein consecutive data signal components are transmitted in said different directions without regard to the order of directional transmission of said reference signal components.

18. A transceiver station for directional radio communication in a wireless communications network between a first station and a second station, said transceiver station comprising:
  means for transmitting a plurality of communication bursts from said first station to said second station, each of said bursts being substantially continuous and comprising a reference signal having a plurality of reference signal components and a data signal having a plurality of data signal components, said means being operable to transmit respective signal components of said reference signals in substantially different directions, the data signal components being transmitted in said substantially different locations,
  wherein said reference signal components are transmitted consecutively,
  wherein a number of said plurality of data signal components are transmitted in substantially different directions, at different times and consecutively, and
  wherein the order of directional transmission of said data signal components corresponds to that used during transmission of said reference signal components.

19. A transceiver station for directional radio communication in a wireless communications network between a first station and a second station, said transceiver station comprising:
  means for transmitting a plurality of communication bursts from said first station to said second station, each of said bursts being substantially continuous and comprising a reference signal having a plurality of reference signal components and a data signal having a plurality of data signal components, said means being operable to transmit respective signal components of said reference signals in substantially different directions, the data signal components being transmitted in said substantially different locations,
  wherein a number of said plurality of data signal components are transmitted in substantially different directions, at different times and consecutively, and
  wherein consecutive data signal components are transmitted in said different directions without regard to the order of directional transmission of said reference signal components.

* * * * *